No. 11,926. Reissued Aug. 13, 1901.

M. A. SHERWOOD.

STAGE ILLUSION APPARATUS.

(Application filed Jan. 22, 1901.)

5 Sheets—Sheet 1.

WITNESSES:

M. S. Blondell.

Amos W. Hart

INVENTOR

M. A. Sherwood.

BY Munn & Co.

ATTORNEYS

No. 11,926. Reissued Aug. 13, 1901.

M. A. SHERWOOD.

STAGE ILLUSION APPARATUS.

(Application filed Jan. 22, 1901.)

5 Sheets—Sheet 2.

WITNESSES:

M. D. Blondel

Amos W. Hart

INVENTOR

M. A. Sherwood.

BY Munn & Co.

ATTORNEYS

No. 11,926. Reissued Aug. 13, 1901.

M. A. SHERWOOD.

STAGE ILLUSION APPARATUS.

(Application filed Jan. 22, 1901.)

5 Sheets—Sheet 3.

WITNESSES:

M. D. Blondell

Amos W. Hart

INVENTOR

M. A. Sherwood.

BY Munn & Co.

ATTORNEYS

No. 11,926. Reissued Aug. 13, 1901.
M. A. SHERWOOD.
STAGE ILLUSION APPARATUS.
(Application filed Jan. 22, 1901.)
5 Sheets—Sheet 4.
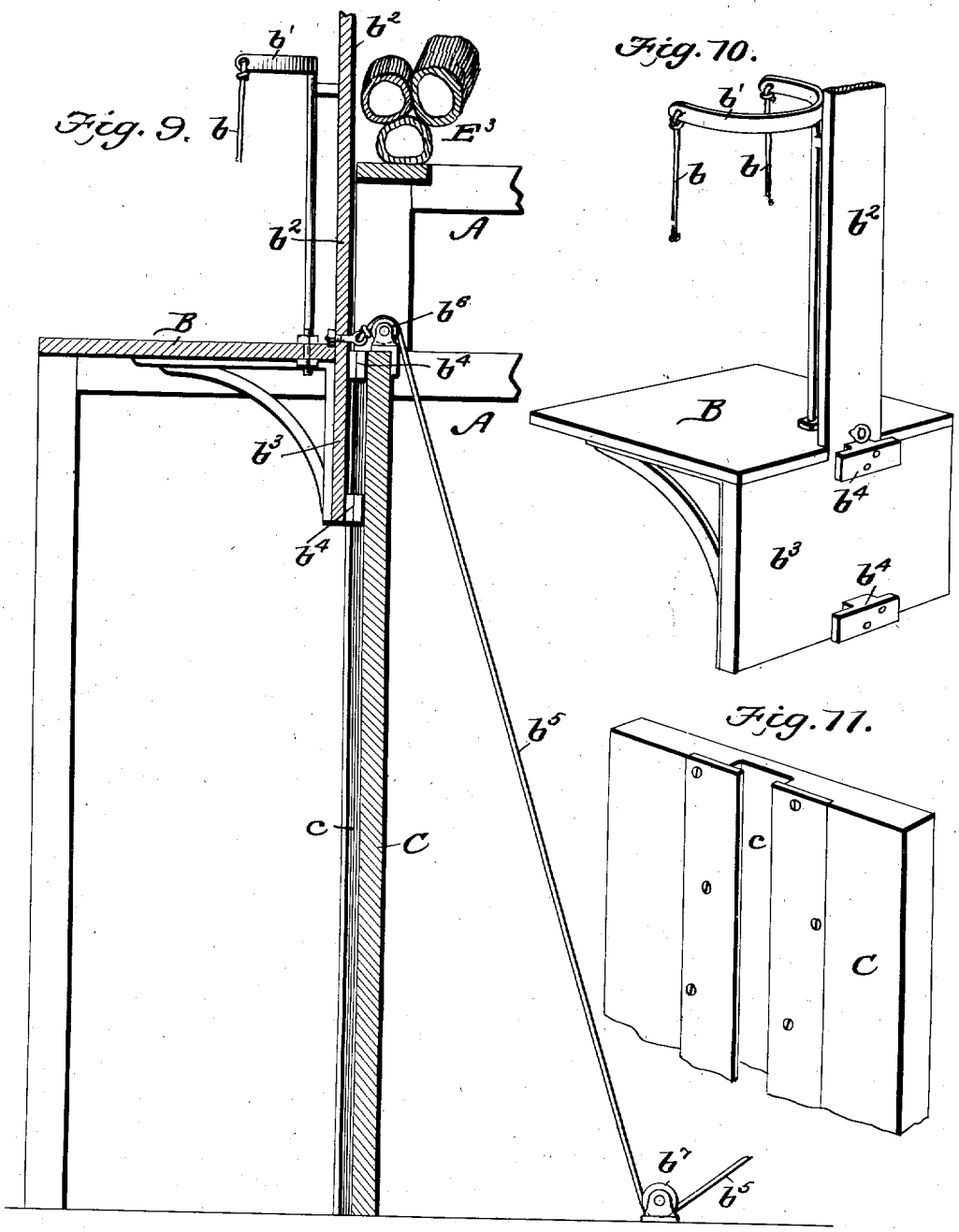
WITNESSES:
W. D. Blondell.
Amos W. Hart
INVENTOR
M. A. Sherwood.
BY Munn & Co.
ATTORNEYS No. 11,926. Reissued Aug. 13, 1901.

M. A. SHERWOOD.

STAGE ILLUSION APPARATUS.

(Application filed Jan. 22, 1901.)

5 Sheets—Sheet 5.

WITNESSES:

M. S. Blondell.

Amos N. Hart

INVENTOR

M. A. Sherwood.

BY Munn & Co.

ATTORNEYS

UNITED STATES PATENT OFFICE.

MORGAN A. SHERWOOD, OF WASHINGTON, DISTRICT OF COLUMBIA.

STAGE ILLUSION APPARATUS.

SPECIFICATION forming part of Reissued Letters Patent No. 11,926, dated August 13, 1901.

Original No. 661,426, dated November 6, 1900. Application for reissue filed January 22, 1901. Serial No. 44,233.

*To all whom it may concern:*

Be it known that I, MORGAN A. SHERWOOD, of Washington city, in the District of Columbia, have invented a new and Improved Apparatus for Producing Stage Illusions, of which the following is a specification.

My invention is an improved apparatus for producing stage illusions, particularly with respect to fire and flame.

It includes fixed parts which are illuminated, means for producing an air blast or current, a flexible medium or fabric arranged in the path of such air-blast, and a light so arranged as to cast its rays upon the fabric, so that the latter is supported and waved while apparently in a glow.

The invention further includes means for producing a scenic representation of the burning of a person at the stake, with wonderfully realistic and startling effect, and also means for producing fire and flame effects in connection with scenic representation in general, and which are likewise capable of use in other relations.

The details of construction, arrangement, and operation are as hereinafter described and claimed, reference being had to accompanying drawings, (five sheets,) in which—

Figure 1:
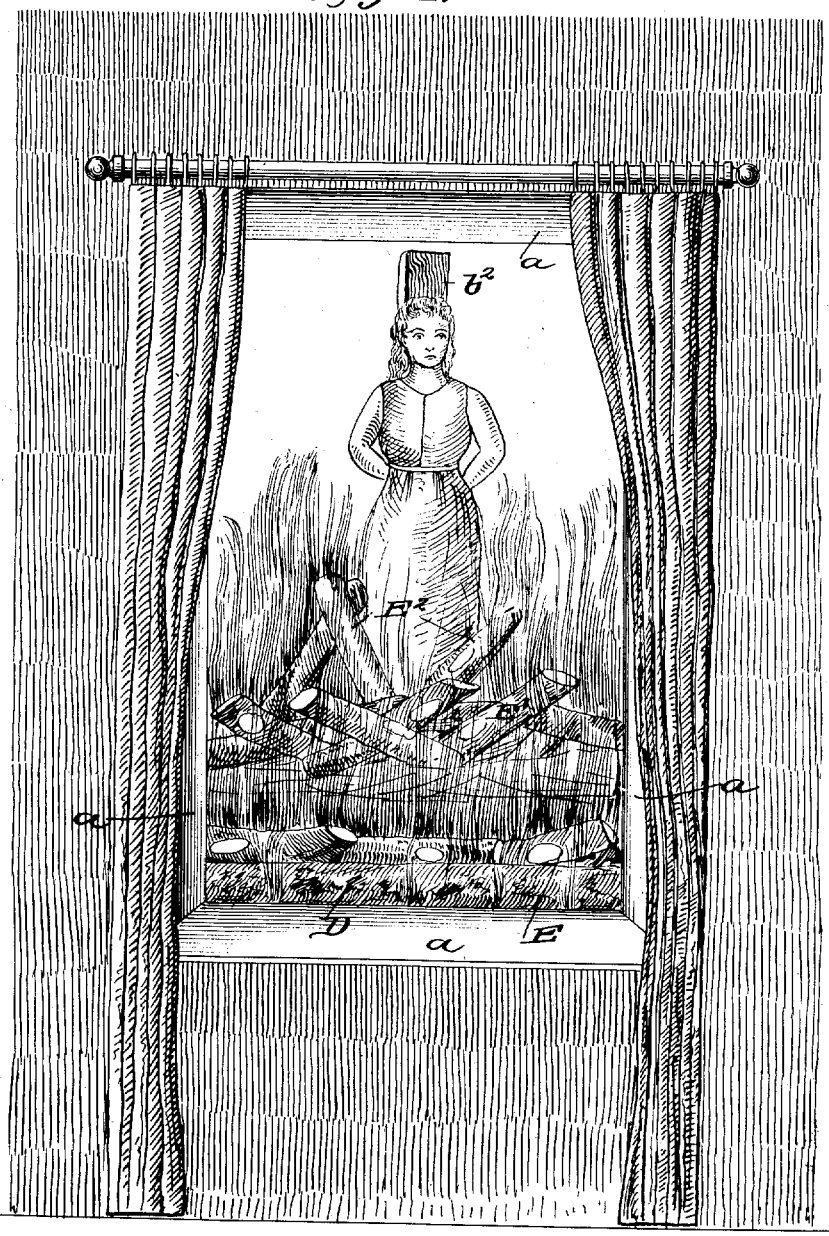
Figure 2:
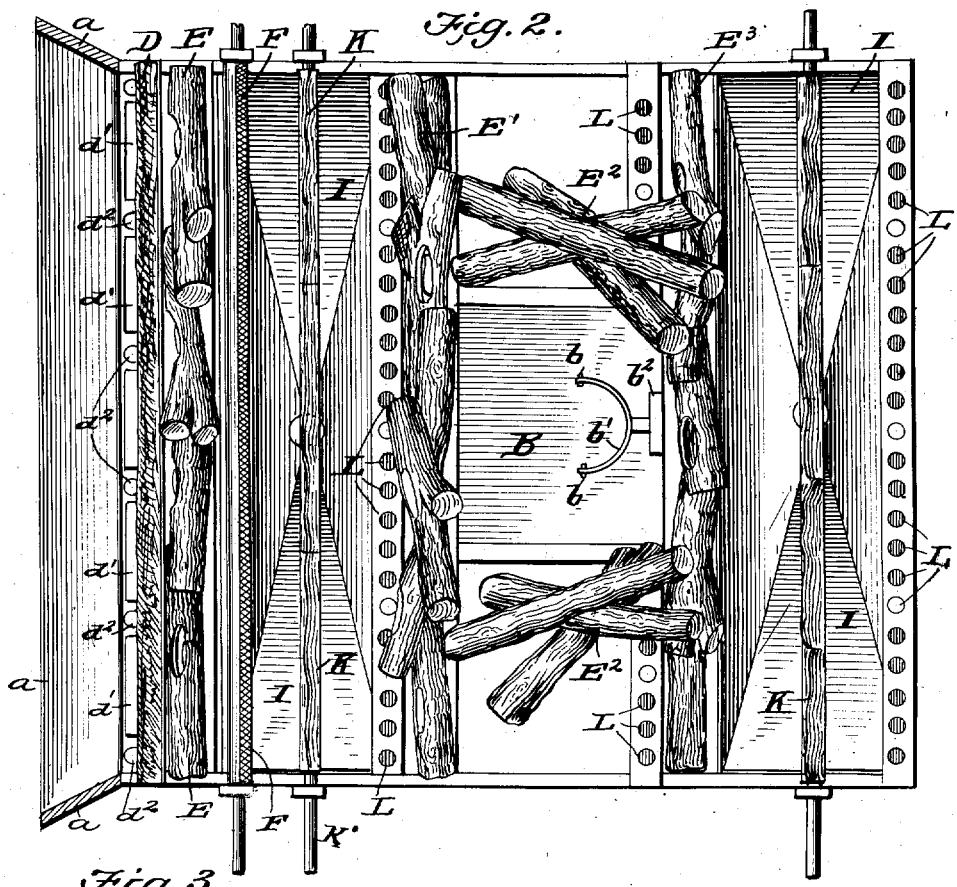
Figure 3:
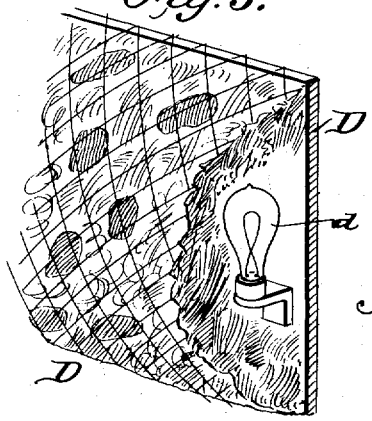
Figure 4:
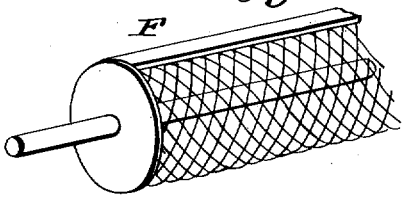
Figure 5:
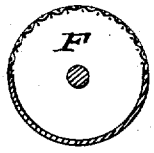
Figure 6:
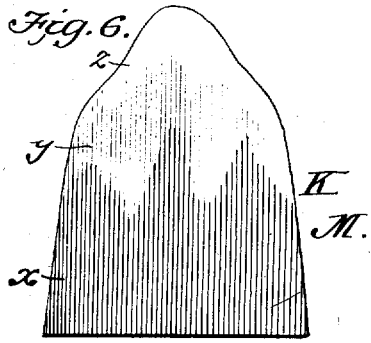
Figure 7:
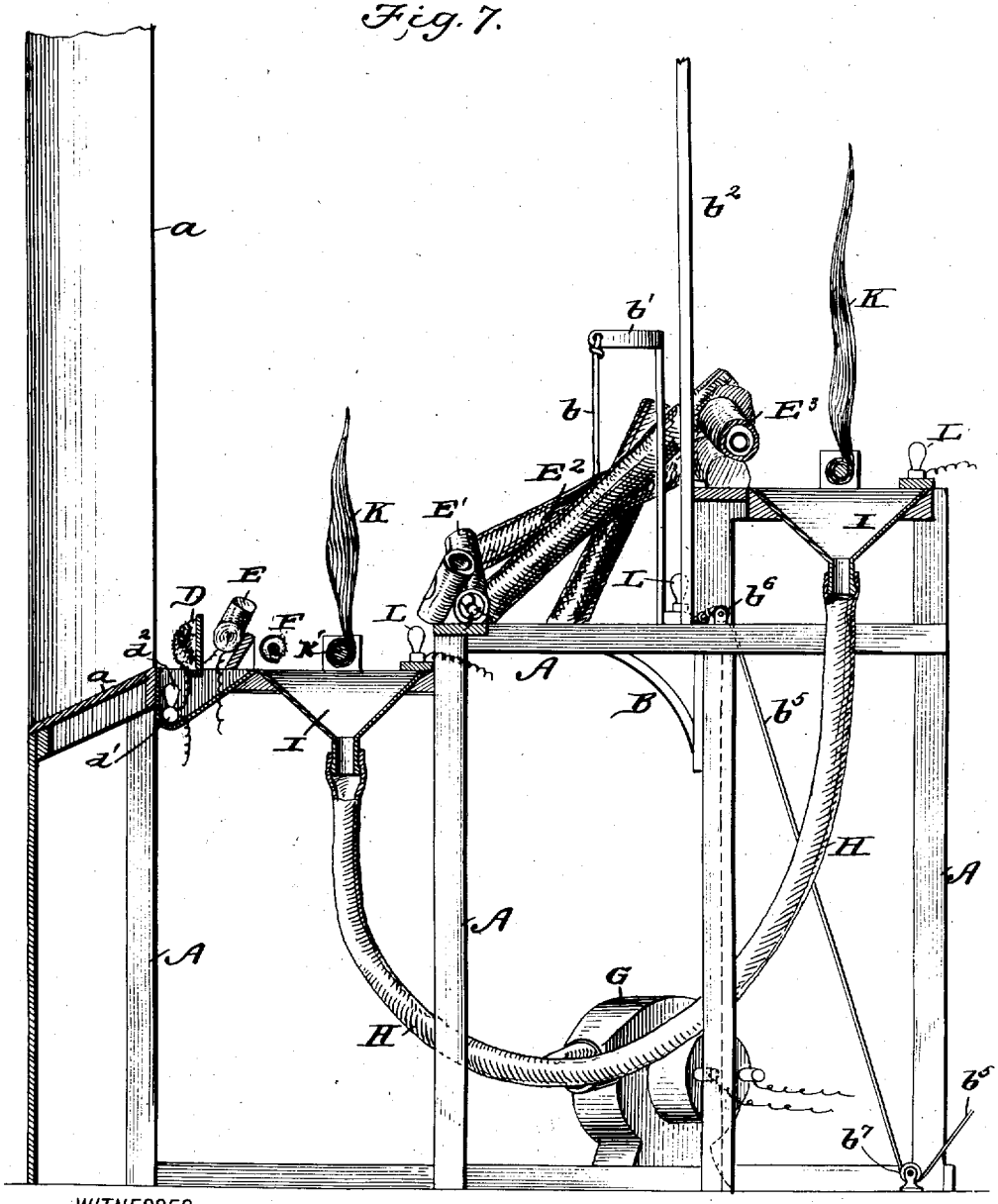
Figure 8:
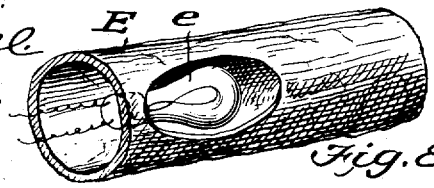
Figure 72:
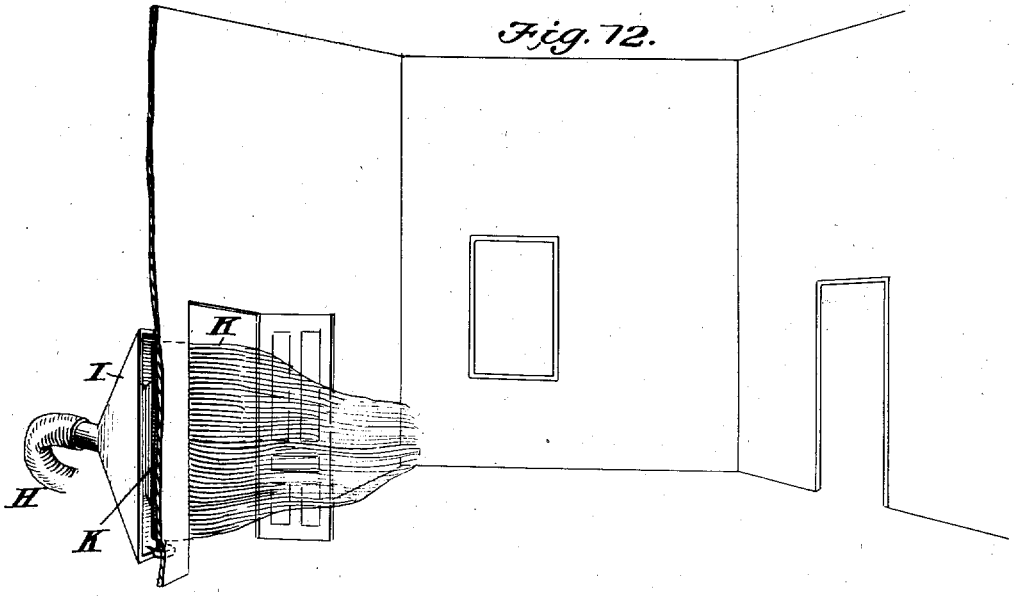
Figure 73:
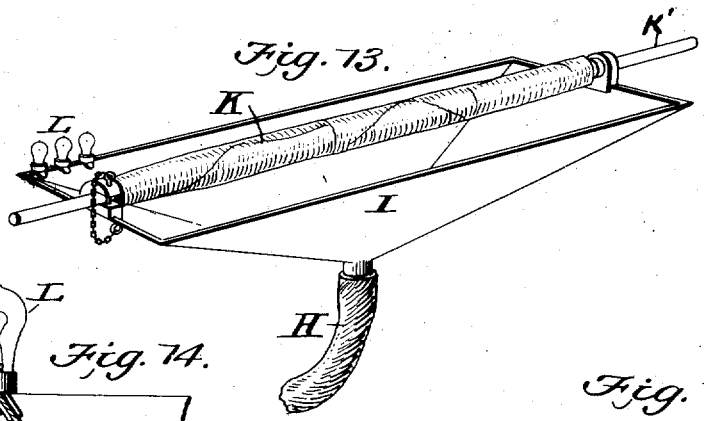
Figure 74:
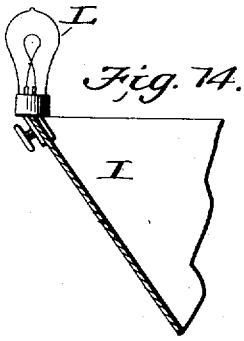
Figure 75:
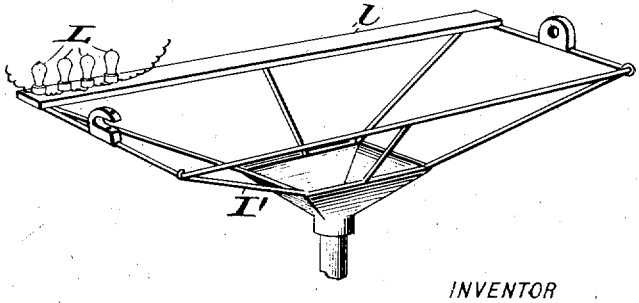

Figure 1 is a front view of my improved apparatus as in use. Fig. 2 is a plan view of the same. Fig. 3 is a perspective view of a portion of a fireback. Fig. 4 is a perspective view of a portion of the spark-box or distributer. Fig. 5 is a cross-section of the same. Fig. 6 is a face view of one of the strips or streamers employed in representing flame. Fig. 7 is a vertical section of the apparatus shown in Figs. 1 and 2. Fig. 8 is a perspective view of a fire-log. Fig. 9 is an enlarged vertical section of the trap forming part of the apparatus. Fig. 10 is a perspective view of the trap proper. Fig. 11 is a perspective view of a portion of the guide for the slidable trap proper. Fig. 12 is a perspective view illustrating a particular application of the flame-simulating portion of the apparatus. Fig. 13 is a perspective view of one form of such portion of the apparatus. Fig. 14 is an enlarged section of a portion of the apparatus shown in Figs. 12 and 13. Fig. 15 is a perspective view of a modified form of the flame-simulating apparatus.

As shown best in Fig. 7, pieces K of flexible material or fabric are attached to a rod or bar extending entirely or part way across the stage and beneath them is arranged an air-blast apparatus, while lights L are located in due proximity to the pieces K, so as to throw a glow thereon. By this conjunction of means I produce a realistic appearance of fire or flame.

The described apparatus may be used alone for a general effect or in connection with other parts, whereby the scenic representation of burning a person may be produced, which I will now describe.

As shown in Fig. 1, (see also Fig. 7,) the scenic representation is preferably produced behind a rectangular frame $a$, set vertically and provided with slidable curtains which are drawn apart while the exhibition is in progress.

A framework A, constructed in any suitable manner, supports the fixed and movable parts embodying the invention. The individual personating the historic or other character whose burning is to be represented is supported upon a vertical slidable trap B (see Figs. 9 and 10) and is secured by cords or chains $b$, attached to curved arms $b'$, fixed on a supporting-bar $b^2$ in front of the stake, both of which are fixed attachments of the trap proper. The arms $b'$ partly embrace the body of the person, and thus afford due support for the same during the exhibition. The trap B is provided with a back piece $b^3$, (see Figs. 10 and 11,) having T-shaped lugs $b^4$, that fit and slide in a corresponding groove $c$ in the fixed guide-bar C, constituting a part or attachment of the rigid framework A. The trap B is supported at the required maximum height, as in Figs. 7 and 9, by means of a rope $b^2$, that passes over a pulley $b^6$ at the top of guide C, and under a second pulley $b^7$, attached to floor. The said rope $b^5$ serves as the manual means for lowering the trap B as required in the progress of the scenic representation.

It is necessary to the highest artistic effect and complete illusion that a simulation of incandescence and flame shall be produced successively and also simultaneously. To this end I combine the following instrumentalities: I arrange a fixed fireback D at the front of the framework A in connection with a transverse row of artificial fire-logs E, which are placed in rear of the same. Some of these logs are hollow, as shown in Fig. 8, and contain electric incandescent lamps *e*, having red globes or bulbs. The fireback D is composed of coarsely-woven wire, a filling of excelsior and tinsel, and electric incandescent lamps *d*. By this assemblage of parts a close imitation of natural combustion is produced. To further increase the illusion, smoke-pots *d'*, Fig. 7, are located below and in front of the fireback, and also a series of red-globe incandescent lamps $d^2$. For greater safety these parts *d'* and $d^2$ are placed and supported in a sheet-metal trough. The smoke rises from the pots *d'* and floats over and among the fireback and fire-logs, while the lamps $d^2$ throw a fresh red glow on the adjacent parts. Another transverse row E' of fire-logs is arranged farther back and just in front of the trap B. Still other fire-logs $E^2$ are placed at each side of the trap, and a complete row $E^3$ is located behind the same.

I locate the movable spark-discharging and flame-simulating agencies (see Figs. 2, 4, and 7) in rear of the first row of fire-logs E and other flame-simulators in rear of the fourth row $E^3$. In other words, the flame-simulating agencies being arranged both in front and rear of the trap B, the person standing on the latter appears to the observers in front as if surrounded or partly enveloped by real flames.

The spark discharging and propelling means are as follows: Across the framework (see Figs. 1, 2, and 7) and directly in rear of the front row E of fire-logs I arrange a cylinder F, (see Fig. 4,) which is imperforate on one side and composed of coarse wire on the other. This cylinder F is supported by a central shaft or axle whose ends are extended, as shown in Fig. 2, that they may be grasped for rotating the cylinder to cause discharge of small pieces of tin-foil or tinsel whenever it is desired to produce the illusion of incandescent sparks arising from the fire. It is apparent such discharge will occur whenever the wire-gauze side is turned underneath more or less, as in Fig. 4, and will be arrested when the same is turned uppermost, as in Fig. 5. The tinsel thus discharged downward by gravity is arrested and carried upward by means of an air-blast and appears to rise from the fire-logs. The blast is preferably produced by the following means: A blower G, Fig. 7, operated by a suitable motor, is located nearby and connected by flexible tubes H with the apex of hoods or bonnets I, whose open side is held uppermost. These hoods are shown supported in fixed position in the framework A, but adapted for convenient detachment. When the blower G is operated, the same forces air through the tubes H, which discharge into and from the hoods I as a blast, and carries up the sparks discharged into the front hood from the rotatable holder F.

The special means for producing a flame illusion as distinguished from mere incandescent effects are the streamers K, Fig. 7, and lamps L, the construction and arrangement of which parts are as follows: The streamers K are elongated pieces or strips of some thin translucent material, such as sateen or china-silk, the same being graduated in color, as illustrated in Fig. 6—that is to say, the base or lower portions of the streamers are colored a deep red, as indicated at *x*, and the middle portion *y* is lighter or amber-hued, while the outer ends *z* are preferably left uncolored. These streamers are secured to rollers K', that extend across the hoods I and are journaled in suitable bearings adapted to permit their convenient removal when desired. The ends of the rollers K' are extended, so they may be grasped to rotate them when it is desired to unwind or wind on the streamers K—that is to say, by rotating the rollers K' one way the streamers K will be unwound and extended more or less, and being carried up and supported by the blast, as shown in Fig. 7, they curl, twist, and fly about in such a manner that when duly illuminated they simulate the appearance of sheets and forks of natural flame so closely as to defy detection at a distance of a few feet. The perfection of illusion is attained by use of the red-globed lamps L, arranged behind the streamers and parallel thereto. These lamps being directly opposite the base or lower portions of the streamers, illuminate such portions most strongly and impart to the whole a vivid glow having an entirely realistic effect, so that the streamers appear to be shifting forks, sheets, and masses of flame shooting upward.

I desire it understood that in the broadest aspect of my invention I do not restrict myself to the described and proferred means for extending and retracting the streamers K, but propose to employ any which may suit my purpose—namely, to produce the effect of a gradually increasing or decreasing combustion and flame.

The apparatus assembled and used as a whole serves to produce most realistic and startling fire and flame effects and is particularly adapted for the scenic representation of the burning of a person at the stake—say a celebrated or historic personage, such as Joan of Arc. The person impersonating her will stand upon the trap B, raised at first to its full height, as shown in Fig. 1, and be bound by the cords *b* to the vertical bar or stake. The apparent fire is started by gradually turning the electric current on all or a portion of the lamps located in the fireback D and series of fire-logs E E' $E^2$ $E^3$, also on the lamps L, that illuminate the streamers K. The latter are gradually unrolled and extended and the blast turned on to carry them up and cause the wavering or shifting, whereby the visual effect of natural flame is produced.

As the burning progresses the impersonator acts her role in a duly artistic and realistic manner, and the trap B is gradually lowered, so that she appears to sink and die among the flames, which are also reduced, as desired, by retracting the streamers K.

I illustrate in Fig. 12 one of the applications of the flame-simulating portion of my apparatus—that is to say, one of the portable hoods I, with its attached lamps L and streamer-carrying rollers K′, is held close to a stage entrance or door, and the streamers K, carried out by the blast, pass through the door and appear to the audience as genuine flame. It is obvious the same means may be used with highly-realistic effect in connection with roofs or other portions of buildings. In fact, this particular part of the apparatus has a wide application in use.

In place of a hood proper I may use a frame I′, Fig. 15, which is more or less open or skeleton-like. I prefer to attach lamps L to a bar *l*, as shown in Fig. 15. Further, I do not restrict myself in all cases to the exact arrangement of parts producing apparent incandescence, but propose to employ any parts capable of producing a suitable representation.

In practice I use some white-globe lamps among the ruby ones for producing a more lively light effect on the streamers.

What I claim is—

1. An apparatus for producing fire and flame illusion, consisting of fixed parts which are illuminated and appear more or less incandescent, flexible and movable parts arranged adjacent and adapted to simulate flame, means for illuminating such parts, and a blast-producing agent, substantially as shown and described.

2. An apparatus for producing fire and flame illusion, consisting of fixed parts representing combustible material, lights arranged therewith for illumination and production of apparent incandescence, flexible streamers arranged behind such fixtures, lamps for illuminating said streamers, and a blast-producing agent, substantially as shown and described.

3. An apparatus for producing fire and flame illusion, consisting of fixed portions representing wooden logs, means for illuminating and producing apparent incandescence of such logs, vertically movable or extensible streamers composed of thin, light flexible material, arranged behind the logs, lamps for illuminating said streamers, and a blast-producing agent, substantially as shown and described.

4. An apparatus for producing fire and flame illusion, consisting of a supporting-frame, a series of imitation fire-logs, and flame-simulating devices, a blast-producing agent, a fireback comprising a suitable rigid backing, a filling including reflecting material having interspersed lamps, and a front through which the filling appears, the said fireback being arranged in front of the logs and constructed as described, a series of red lamps arranged in front of and below the fireback, and one or more smoke-producing devices, located below the fireback, as specified.

5. An apparatus for producing fire and flame illusion, consisting of fixed objects and lights illuminating them so that they have the appearance of combustible material in a state of incandescence, one or more streamers arranged along with said material, a blast-producing agent, and a vertically-movable device or trap for supporting and gradually lowering a person impersonating one being burned, substantially as shown and described.

6. An apparatus for producing fire and flame illusion, consisting of one or more streamers attached to a frame, a blast-producing agent, a vertically-movable trap located behind such streamers, and adapted to descend below them, and means for controlling said trap, to permit its gradual descent, as shown and described.

7. In an apparatus for producing flame illusion, the combination, with a blast-producing agent, of a streamer consisting of thin fabric, a roller on which the streamer is wound, and a support or holder for said roller, substantially as shown and described.

8. A portable apparatus for producing flame illusion, consisting of a hood open on its upper side, a flexible air-pipe connected with the apex of the hood, one or more colored streamers secured to said frame, and a series of red lamps attached to the frame and arranged in rear of said streamers, as shown and described.

9. A portable apparatus for producing flame illusion consisting of a frame, one or more colored streamers, and means for extending and retracting them, one or more colored lamps secured to the frame adjacent to and behind said streamers, a blast-producing agent connected with the frame, and flexible connections between the frame and the blast-operating agent, substantially as shown and described.

10. An apparatus for producing a flame effect, consisting of flame-simulating agencies, a blast-producing agent, a spark-distributer consisting of a rotatable box arranged over the point of blast discharge, and having perforated and imperforate sides, substantially as shown and described.

MORGAN A. SHERWOOD.

Witnesses:
AMOS W. HART,
JESSE MIDDLETON.